(12) United States Patent
Pazdirek et al.

(10) Patent No.: US 6,324,940 B1
(45) Date of Patent: Dec. 4, 2001

(54) COMPOSITE LINK

(75) Inventors: Jiri V. Pazdirek, Schaumburg; Ernst Matthew Gaertner, Arlington Heights; Michael T. Burzawa, Harwood Heights, all of IL (US)

(73) Assignee: MacLean-Fogg Company, Mundelein, IL (US)

( * ) Notice: Subject to any disclaimer, the term of this patent is extended or adjusted under 35 U.S.C. 154(b) by 0 days.

(21) Appl. No.: 09/545,813

(22) Filed: Apr. 7, 2000

Related U.S. Application Data (63) Continuation-in-part of application No. 08/910,373, filed on Aug. 13, 1997.

(51) Int. Cl.$^7$ ........................................... G05G 1/00
(52) U.S. Cl. ........................ 74/579 R; 174/47; 74/586; 57/230
(58) Field of Search .................. 74/579 R, 586, 74/594, 579 E; 174/47, 211, 216, 209; 57/230

(56) References Cited

U.S. PATENT DOCUMENTS

| | | |
|---|---|---|
| 369,883 | 9/1887 | Richards . |
| 2,602,766 | 7/1952 | Francis . |
| 2,970,186 | 1/1961 | Von Platen . |
| 3,014,088 | 12/1961 | Austin et al. . |
| 3,328,515 | 6/1967 | Vose . |
| 3,362,252 * | 1/1968 | Ditlinger ..................... 74/579 R |
| 3,571,492 | 3/1971 | Clark et al. . |
| 3,592,959 | 7/1971 | Dougherty . |
| 4,183,261 | 1/1980 | Eiselbrecher et al. . |
| 4,198,538 | 4/1980 | Lusk . |
| 4,202,382 | 5/1980 | Westhead . |
| 4,300,410 * | 11/1981 | Raghupathi et al. .............. 74/579 R |
| 4,465,392 * | 8/1984 | Lang ..................... 403/24 |
| 4,491,687 | 1/1985 | Kaczerginski et al. . |
| 4,603,084 * | 7/1986 | Drachenberg et al. ........ 74/579 R X |
| 4,671,336 | 6/1987 | Anahara et al. . |
| 4,704,918 * | 11/1987 | Orkin et al. ....................... 74/579 R |
| 4,841,801 * | 6/1989 | Tice ..................... 74/579 R |
| 4,958,049 | 9/1990 | Alfieri et al. . |
| 4,992,313 | 2/1991 | Shobert et al. . |
| 5,374,780 | 12/1994 | Pazdirek . |
| 5,406,033 | 4/1995 | Pazdirek . |
| 5,690,034 * | 11/1997 | Schahl et al. ..................... 74/579 R |
| 5,845,476 | 12/1998 | Kolmes . |

FOREIGN PATENT DOCUMENTS

| | | |
|---|---|---|
| 1074367 | 7/1967 | (GB) . |
| 54-71253 * | 7/1979 | (JP) . |
| 59-97311 * | 5/1984 | (JP) . |

* cited by examiner

*Primary Examiner*—David A. Bucci
*Assistant Examiner*—Colby Hansen
(74) *Attorney, Agent, or Firm*—Richard G. Lione; Brinks Hofer Gilson & Lione (57) ABSTRACT

A composite link comprising a fiber reinforced composite tube, an end fitting on each end of the tube and layers of resin impregnated fiber wound over the end fittings and tube. The fiber is laid in a primary layer formed by winding longitudinally over the end fittings and a secondary layer wound transversely around the primary layer and the tube. The tube, fitting and layers of fiber are encased in a layer of shield material such as paint or a polymer, for example.

8 Claims, 8 Drawing Sheets

COMPOSITE LINK

RELATED APPLICATION

This application is a continuation-in-part of application Ser. No. 08/910,373, filed Aug. 13, 1997 entitled COMPOSITE LINK.

FIELD OF THE INVENTION

This invention relates generally to a link. It relates particularly to a suspension link or the like having a composite fiber construction.

BACKGROUND OF THE INVENTION

Links are used to connect two components together. In automotive applications, links are often used in the suspension system. In that context, links typically allow connected suspension system components to move along one axis relative to each other.

One known type of link is cast or forged of metal. Each end of the link includes a metal cylinder. The axes of the cylinders are parallel to each other. The cylinders are connected to each other by a metal rod or tube. A cylindrical rubber insert is press fitted into each cylinder. A hollow metal bushing is seated in each insert. Bolts extending through the bushings are connected to respective components. A nut is tightened onto each bolt to hold the link.

The parallel bushings allow the components at each end of the link to rotate on an axis. The rubber inserts allow limited angular and lateral motion. The rubber inserts also cushion vibrations and shocks. Thus, vibrations and shocks are isolated from one end of the link to the other.

There are a number of problems associated with this type of link, however. Since the link is made primarily metal, it adds substantial weight to a vehicle. Increased weight results in decreased gas mileage. Additionally, the forging, casting or welding necessary to assemble the link is costly.

SUMMARY OF THE INVENTION

An object of the present invention is to provide an improved composite link.

Another object is to provide an improved composite link which is as sturdy as its predecessors, or sturdier, yet is lighter and less expensive.

The foregoing and other objects are realized in a composite link comprising opposing end fittings connected by a primary layer of fiber formed by a strand of fiber wound longitudinally between the fittings and a secondary layer of fiber formed by a strand wound transversely of the first layer. The strand forming the primary and secondary layers is preferably a continuous strand. The strand may be glass fibers or other kinds of fibers. It is wetted with resin prior to winding.

In one embodiment, a composite link includes a connecting rod having a first cross-section shape. End fittings are seated on opposing ends of the rod. At least one end fitting has first and second ends. The first end has a second cross-section shape that substantially conforms to the first cross-section shape and the second end has a third cross-section shape that is different than the second cross-section shape. A fiber is wound around the second end, over a portion of the first end, and over a portion of the connecting rod.

In another embodiment, a composite link includes a center member having a first cross-section shape. An end fitting has at least a first recessed surface, a second cross-section shape that is different than the first cross-section shape and that includes the first recessed surface, and a transition section. The transition section has a second cross-section shape that substantially conforms to the first cross-section shape at a first end and a third cross-section shape that substantially conforms to the first recessed surface at a second end. A fiber is wound over a portion of the first recessed surface, over a portion of the transition section and over a portion of the center member.

In still another embodiment of the invention, a composite link includes a center member in the form of a square cross-section tube fabricated of fiber reinforced composite. The link further includes an end fitting at each end of the tube. Each fitting includes a substantially rectangular cross-section mounting projection and a generally cylindrical head. The mounting projection on each fitting is received in a corresponding end of the tube.

In the invention, the strand of fiber forming the secondary layer is wound with a high pitch angle around the connecting rod from adjacent one end to adjacent another end of the rod. Then the strand of fiber is wound with a low pitch angle between opposite ends, over the first strand in the secondary layer.

BRIEF DESCRIPTION OF THE DRAWINGS

The invention, including its construction and method of operation, together with additional objects and advantages thereof, is illustrated in the following drawings in which.

DESCRIPTION OF THE PREFERRED EMBODIMENTS

Figures 1, 2:
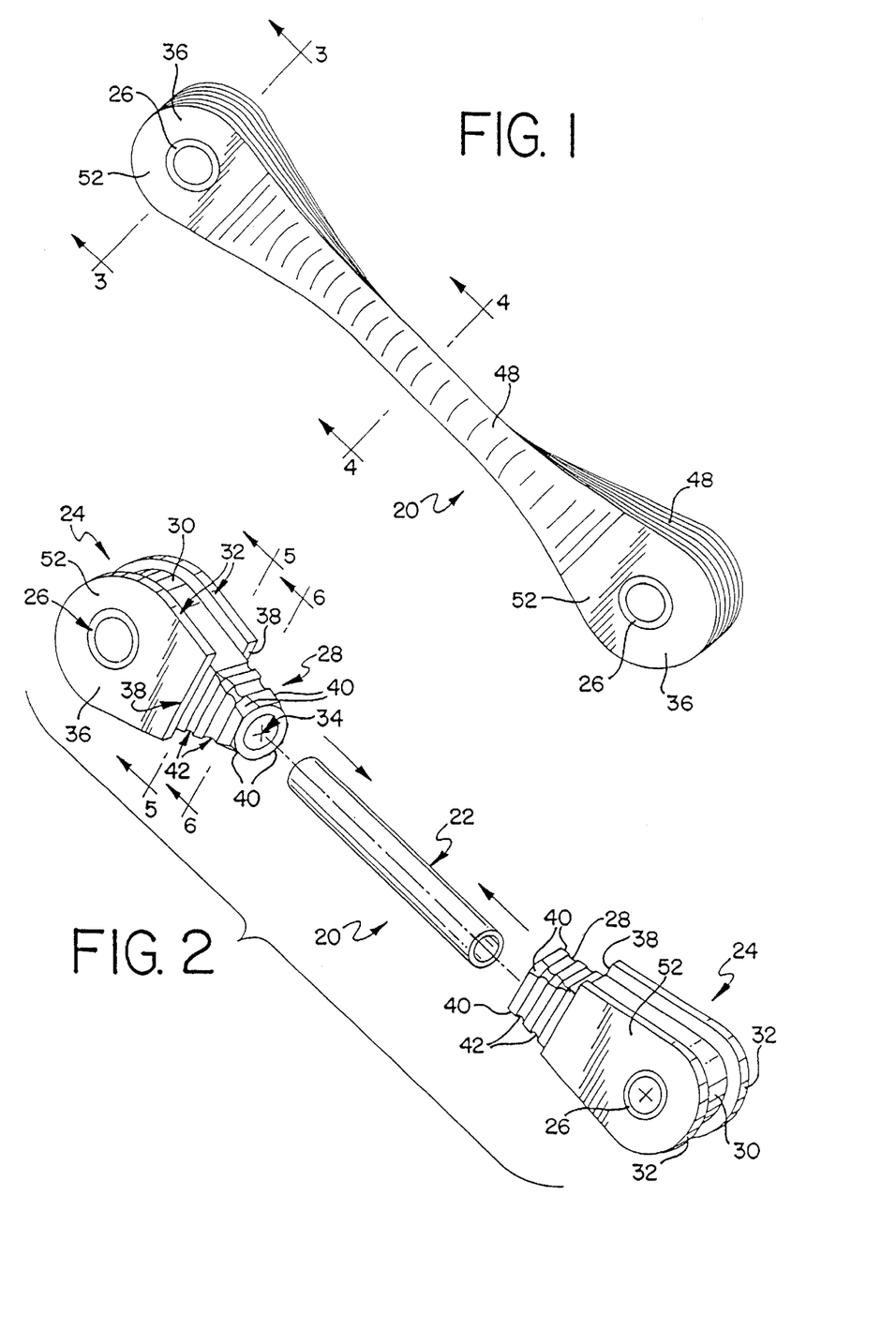
FIG. 1 is a perspective view of a composite link embodying features of one form of the present invention.
FIG. 2 is a perspective view of some of the components of the composite link of FIG. 1.

FIG. 1 illustrates a composite link 20 embodying features of one form of the present invention. The composite link 20 is capable of use as a suspension link in a vehicle suspension system, for example. It may also be used as an insulator, as disclosed in U.S. Pat. No. 5,406,033, the disclosure of which is herein incorporated by reference. For use as an insulator, weathersheds would be moulded onto the composite link 20.

Figure 3:
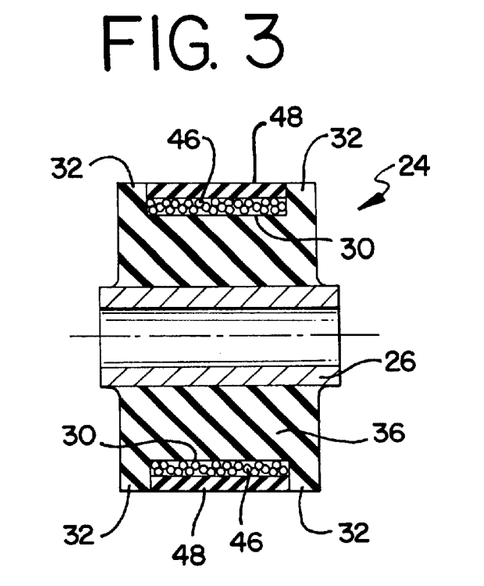
FIG. 3 is a cross-sectional view of the composite link taken along line 3—3 of FIG. 1.
Figure 4:
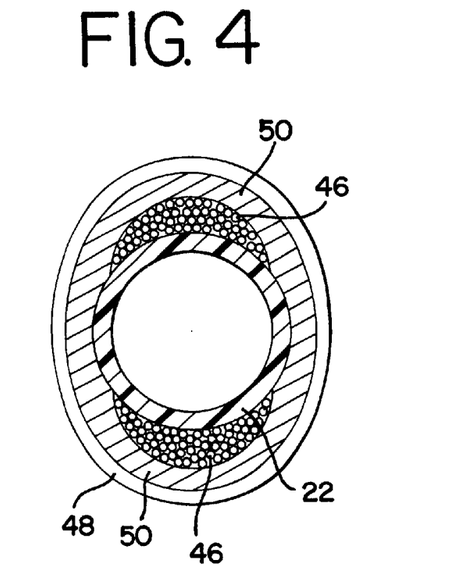
FIG. 4 is an enlarged cross-sectional view of the composite link taken along line 4—4 of FIG. 1.

Referring to FIGS. 2–4, the composite link 20 includes a connecting rod 22 and two end fittings 24. The connecting rod 22 is preferably a hollow tubular member pultruded of fiberglass for higher load requirements and extruded of a polymer for lower load requirements. The connecting rod 22 has a circular cross-section.

Each end fitting 24 is of the same construction as the other end fitting 24. However the end fittings 24 may be of different constructions. Each end fitting 24 includes a bushing 26 seated in an outer body 36. Preferably, the bushing 26 is a metal, such as steel or aluminum, and is cylindrical.

The outer body 36 includes a rod mounting projection in the form of transition section 28, a recessed surface 30, flanges 32, and a connecting rod recess 34. Preferably, the outer body 36 is a molded elastomer, such as rubber, polyurethane or other elastic material. The outer body 36 is molded around the bushing 26. Before molding, an adhesive is applied to the outside of the bushing 26. The adhesive maintains the bushing 26 within the outer body 36. As an alternative to molding the outer body 36 on the bushing 26, the bushing 26 is press assembled into a pre-formed outer body 36.

The recessed surface 30 is defined between the flanges 32. Each flange 32 extends radially outwardly from the recessed surface 30. The recessed surface 30 starts on one side, such as the top, of the outer body 36 adjacent the transition section 28 and curves around to an opposite side, such as the bottom, of the outer body 36 adjacent the transition section 28. Instead of curving around the outer body 36, the recessed surface 30 may comprise a series of connected, flat planar surfaces. The recessed surface 30 may also be rounded, grooved or have other surface texture.

The outer body 36 preferably also includes a step 38 on each of its sides, adjacent the transition section 28. Preferably, each step 38 is the thickness of the corresponding flange 32, and has a height dimension approximately equal to the desired thickness of wound fibers as discussed below.

Figure 5:
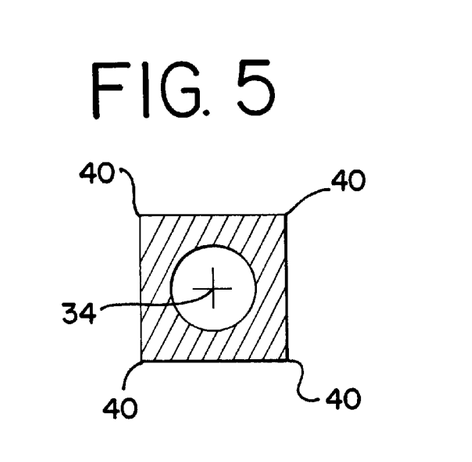
FIG. 5 is a cross-sectional view of the end fitting component taken along line 5—5 of FIG. 2.

The steps 38 and recessed surface 30 form a conceptual connection with the mounting projection or transition section 28. As shown in FIG. 5, the cross-section of the transition section 28 adjacent to the steps 38 (both sides) and recessed surface 30 (top and bottom) is rectangular. Preferably, the transition section 28 is flush with the recessed surface 30, and the steps 38 extend beyond the transition section 28 from the outer body 36. Thus, two edges of the rectangular cross-section seen in FIG. 5 are flush with the two recess surfaces 30.

Figure 6:
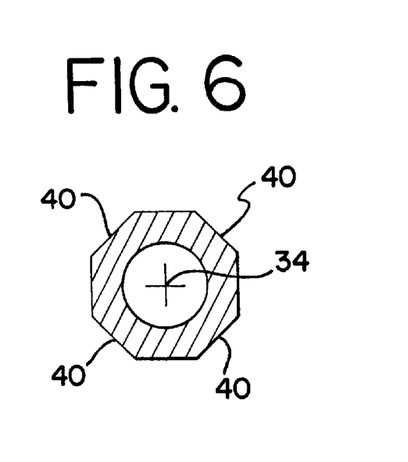
FIG. 6 is a cross-sectional view of the end fitting component taken along line 6—6 of FIG. 2.

Referring to FIGS. 2, 5 and 6, the transition section 28 includes the connecting rod recess 34. The connecting rod recess 34 is formed in the inner end of the end fitting 24. The connecting rod recess 34 is shaped to accept an end of the connecting rod 22. Thus, the connecting rod recess 34 is circular in the present embodiment. The connecting rod recess 34 is preferably ¾ or 1 inch deep, but other dimensions are possible. Preferably, the connecting rod 22 slides into the connecting rod recess 34, but may tightly fit into the connecting rod recess 34.

On the free end of the transition section 28, adjacent the connecting rod recess 34, the cross-section shape of the transition section 28 conforms generally with the cross-section shape of the connecting rod 22. As shown in FIG. 6, the cross-section on the free end of the transition section 28 is rectangular with radiused or chamfered corners 40. The radiused or chamfered corners 40 substantially conform the outer body 36 at that point to the circular connecting rod 22. The amount of radius or chamfering of the corners 40 increases from the conceptual junction with the steps 38 and recessed surface 30 to the end of the outer body 36 with the connecting rod recess 34. Thus, the transition section 28 gradually changes from the recess surface 30, or cross-section of FIG. 5, to the radiused or chamfered corners 40, or cross-section, of FIG. 6.

The mounting projection or transition section 28 provides a substantially smooth transition from the shape of the recessed surface 30 to the shape of the connecting rod 22. The transition section 28 also provides a smooth transition from the dimensions of the recessed surface 30 to the dimensions of the connecting rod 22. For example, the cross-section of FIG. 5 comprises a ¾ inch by ¾ inch rectangle and the cross-section of FIG. 6 comprises a ⅝ inch by ⅝ inch rectangle with radiused or chamfered corners 40.

The mounting projection or transition section 28 has one or more grooves 42 encircling it. Preferably, two circular grooves 42 extend transversely of the corners 40 and are evenly spaced along the transition section 28. The grooves 42 aid in attaching the end piece 24 to the connecting rod 22, as discussed below.

The two end fittings 24 and the connecting rod 22 described above are positioned adjacent each other, as generally shown in FIG. 2. In particular, one end of the connecting rod 22 is placed within the connecting rod recess 34 of one end fitting 24, and the other end of the connecting rod 22 is placed within the connecting rod recess 34 of the other end fitting.

Figure 7:
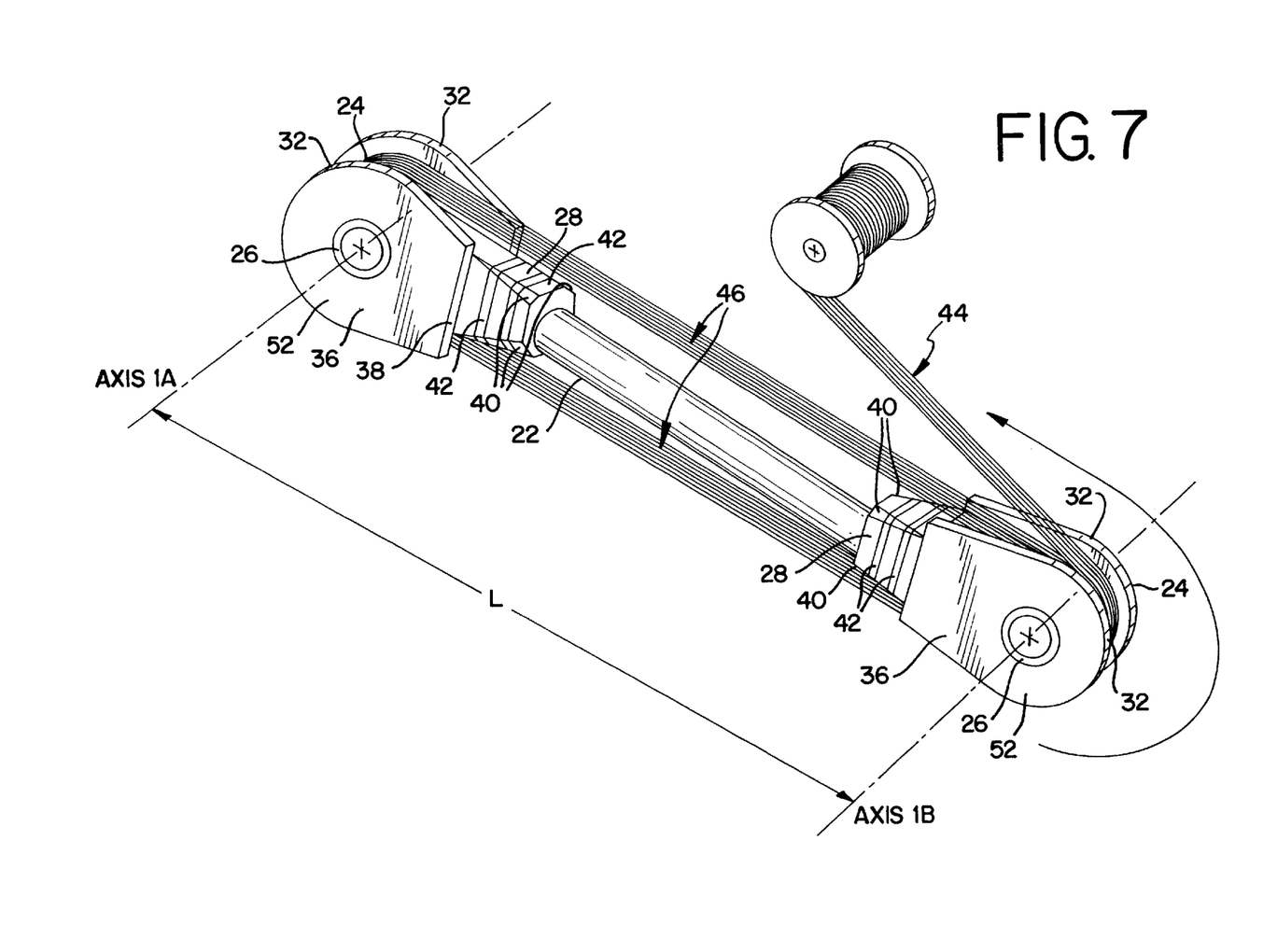
FIG. 7 illustrates one step in the arrangement and method of winding the fibers of the link shown in FIG. 1.
Figures 8, 8A, 8B:
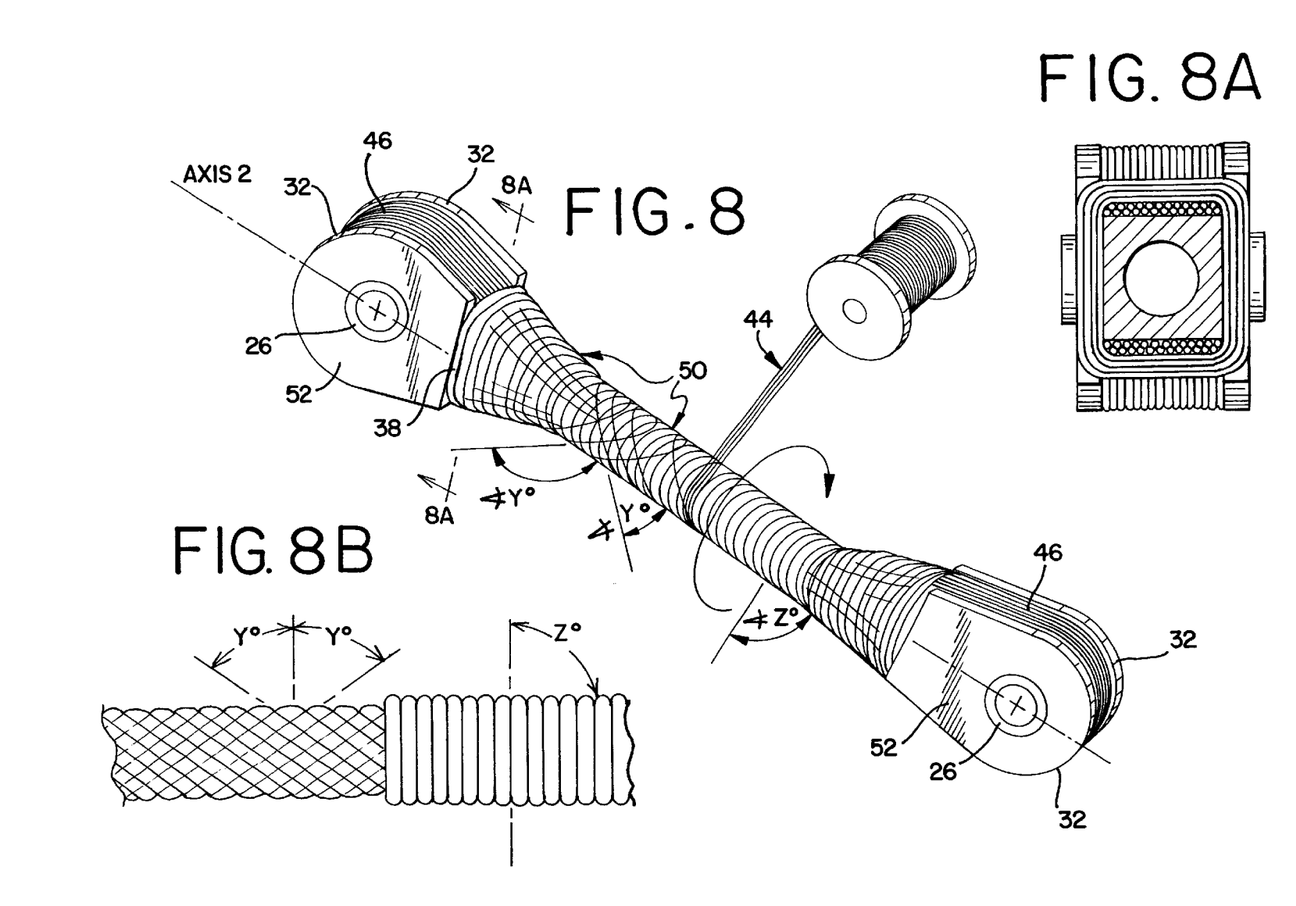
FIG. 8 illustrates another step in the arrangement and method of winding the fibers of the link shown in FIG. 1.
FIG. 8A is a cross-sectional view taken along line 8A—8A of FIG. 8.
FIG. 8B is an enlarged side elevational view of the winding pattern on the connecting rod of FIG. 8.

Referring to FIGS. 7 and 8, the composite link 20 includes at least one winding of one or more strands of fibers 44. Preferably, the fibers 44 are glass fibers, but other fibers, such as carbon (graphite), polymer (aramid) or combination fibers, may be used. Although a variety of glass fibers would be suitable, the preferred fiber is "E-glass". "E-glass" is an inexpensive, electrical grade fiber having high mechanical strength. While FIG. 7 shows multiple fibers 44, the fibers 44 may alternatively comprise a single fiber 44 or a crosswoven tape of fibers 44.

The composite link 20 is made by resin coating and then winding the fibers 44 over the end fittings 24 and rod 22. Generally, the fibers 44 are wound longitudinally between and around the end fittings 24. The longitudinal winding forms a primary layer 46 of resin coated fibers 44 and joins the end fittings 24 together as an integral part of the composite link 20.

As shown in FIG. 8, the same continuous fibers 44 are then wound transversely around the primary layer 46 to form a secondary layer 50 of fibers 44. Alternatively, a different strand or strands of fiber 44 may be used for any portion of the primary or secondary layers 46, 50.

These winding steps are carried out using a known winding method. For a discussion of filament winding technology, including a listing of patents related thereto, reference is made to *Filament Winding,* a book by Peters, Humphrey and Foral, published by SAMPE, the Society of Advanced Materials and Process Engineers, the contents of which are incorporated herein by reference.

Referring to FIGS. 7 and 8, details of the winding of the fibers 44 for the composite link 20 are illustrated. Initially, the end fittings 24 are secured in the relative positions shown in FIGS. 7 and 8 by a fixture (not shown). The end fittings 24 are aligned axially and spaced a desired distance apart. The distance L from the axis 1A of the bushing 26 to the axis 1B of the other bushing 26 represents an approximate length of the composite link 20. The fixture secures the end fittings 24 by connection to the bushings 26, and allows some relative movement of the end pieces 24 during fabrication of the composite link 20.

The side surfaces 52 of the end fittings 24 defined by the flanges 32, the steps 38 and the ends of the bushings 26 are preferably covered by the fixture or some other covering during winding of the fibers 44. The covering prevents the surfaces 52 and ends of the bushings 26 from being fouled with resin from the fibers 44.

According to the invention, the continuous strand of fibers 44 is "wetted" in a controlled manner in a liquid resin bath (not shown). For example, the fibers 44 are coated with a polyester, vinylester, epoxy, phenolic, thermoplastic polymer or other material having similar properties. The resin must provide a good mechanical bond and be suitable for high temperature molding, painting, or dipping to create the shield layer 48 shown in FIGS. 1, 3 and 4. Preferably, vinylester is used. The preferred ratio of glass fiber to resin is approximately seventy percent to thirty percent. Other ratios may be used depending on the desired tensile strength. The resin migrates through the fibers 44 to connect the individual fibers 44. In the alternative, the fibers 44 may be pre-impregnated by conventional techniques.

The fibers 44, after resin coating, are repetitively wound from one end fitting 24 to the other end fitting 24, forming a continuous loop of fibers 44. The winding continues until the fibers 44 cover the recessed surfaces 30 of each end fitting 24 across the recessed surface's 30 entire width, as shown in FIG. 3. This longitudinal winding of the fibers 44 forms the primary fiber layer 46 to a thickness of approximately one-half the height of the flanges 32 above the recessed surface 30. Where the composite link 20 includes an odd number of end pieces, such as three, one of the end pieces preferably has higher flanges 32, and/or a wider recessed surface 30, to accommodate the additional windings of fibers 44 necessary to cover the two other end pieces 24 as discussed above.

FIG. 8 illustrates further winding of the fibers 44 to form the secondary layer 50. Preferably, the same strand of fibers 44 used to form the primary layer 46 is wound as one continuous length to form the secondary layer 50. To wind the secondary layer, the fibers 44 are first brought across the primary layer 46 from one of the end fittings 24 and then wound around the primary layer 46 between the end fittings 24. Preferably, the fibers 44 are then wound in multiple passes from one end fitting 24 to the other end fitting 24.

Preferably, the fibers 44 are loosely wound at a low pitch, 10 or 170 degree angle (z) to the axis 2 shown in FIGS. 8 and 8B, in a first pass of the secondary layer 50 formation. Other angles may be used, however. During a second pass, the fibers 44 are tightly wound at a high pitch of approximately a 90 degree angle (z) to the axis 2.

To tightly wind the fibers 44, the fibers 44 are pulled, in tension, against the primary layer 46 as the secondary layer 50 is wound. The tight winding draws the primary layer 46 inward from its original loop path around the end fittings 24 and squeezes air out of the primary layer 46. The tight winding also creates the shape of the composite link 20 shown in FIG. 1. Other angles, passes and varying tension may be used. For example, the number of passes is increased to increase the strength of the composite link 20.

During the second pass, multiple transverse windings of the fibers 44 are used to create a thicker secondary layer 50 adjacent each end fitting 24. In particular, the fibers 44 are wound around the transition section 28 to a thickness close to the height of the step 38. The grooves 42 on the transition section 28 help hold the fibers 44 of the secondary layer 50 in place on the sloping transition section 28. The multiple transverse windings aid the load bearing properties of the composite link 20 and allow for a smooth transition from the side surfaces 52 to the shield layer 48 (see FIGS. 1 and 4). Multiple transverse winding of the fibers 44 may also be used along other portions of the connecting rod 22, such as a thicker winding at the center of the composite link 20.

Along with drawing the primary layer 46 inward, the tension applied during winding of the secondary layer 50 applies force to draw the end fittings 24 toward each other. The force holds the end fittings 24 on the connecting rod 22. The force may draw the end pieces 24 closer together, particularly if the connecting rod 22 is not initially inserted to the entire depth of each recess 34. The force also tends to compact the elastomeric material of the end fittings 24.

After the fibers 44 are wound in the aforedescribed manner to form the composite link 20, the liquid resin is allowed to hard cure. The hard cure permanently secures the end fittings 24 and connecting rod 22 together. If desired, the resin may be oven cured to accelerate the manufacturing process.

Turning to FIGS. 1, 3 and 4, the shield layer 48 is then applied onto the windings 44 of the composite link 20. The shield layer 48 is layer of paint, a coating of dipping type material, or an injection molded coating. The type of material used for the shield layer 48 is based on the cost, aesthetics and the required protection from the environment. For injection molding, the material used is a polymer, such as silicone rubber. Injection molding is preferably used for creating an insulator from the composite link 20. The insulator is of the same construction, only weathersheds are molded onto, or with, the shield layer 48.

The shield layer 48 is applied to completely cover the primary and secondary fiber layers 46 and 50. A fixture, such as the fixture discussed above, covers the surfaces 52 and the exposed portion of the bushings 26 on each end fitting 24. Thus, the fixture masks exposed portions of the end fittings 24, including the insides of the bushings 26. The shield layer 48 is then allowed to dry or harden. Preferably, the shield layer 48 is flush with the side surfaces 52 along the steps 38, and with the flanges 32 above the recessed surfaces 30, after drying or hardening.

Figure 9:
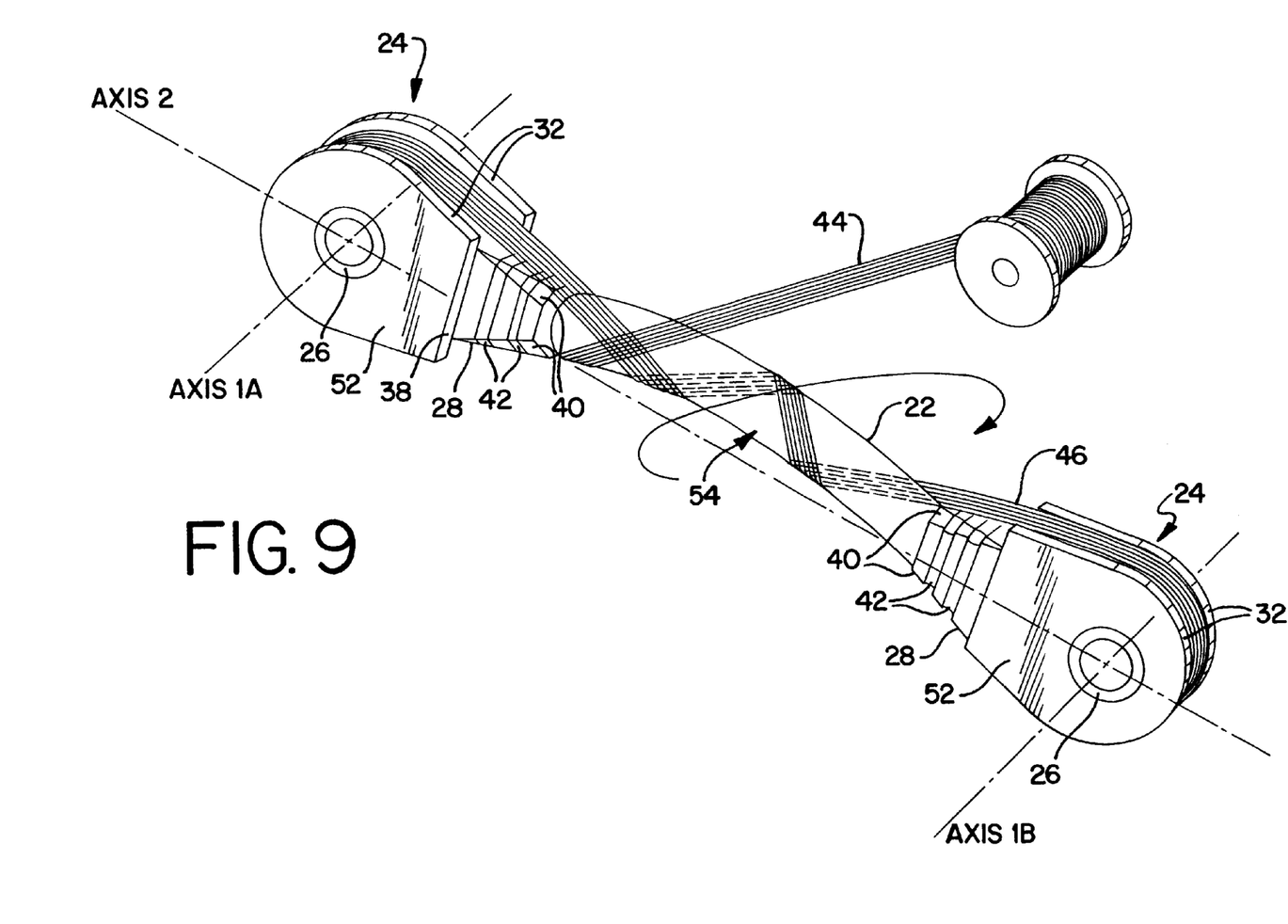
FIG. 9 is a perspective view of a composite insulator with a bent connecting rod and a winding of fiber.

Referring to FIG. 9, an alternative connecting rod 22 is shown. The connecting rod 22 is formed with a bend 54 along its axis 2. The connecting rod recesses 34 are preferably angled into the end fittings 24 in accordance with the degree of the bend 54. Alternatively, the ends of the connecting rod 22 for insertion into each connecting rod recess 34 are angled to be parallel with the axis 2. Other configurations of the connecting rod 22, including the ends or other portions of the connecting rod 22, are possible.

With the rod 22 bent as at 54, the fibers 44 are preferably wound in a different way then discussed above to form the primary layer 46. The fibers 44 are repetitively wound from one end fitting 24 to and around the other end fitting 24. However, instead of forming a loop of fibers 44, the fibers 44 are spiral wound between the end fittings 24, as shown. Like the winding of fibers 44 discussed above with respect to FIGS. 7 and 8, the fibers 44 are wound until the fibers 44 cover the recessed surfaces 30 of each end fitting 24 across the recessed surface's 30 entire width, as shown in FIG. 3. The secondary layer 50 is also formed as discussed above.

Figure 10A:
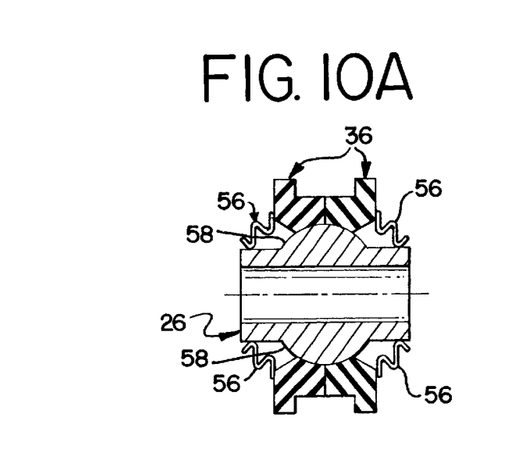
FIG. 10A is a cross-sectional view of an end fitting with a spherical bushing.
Figures 10B, 10E:
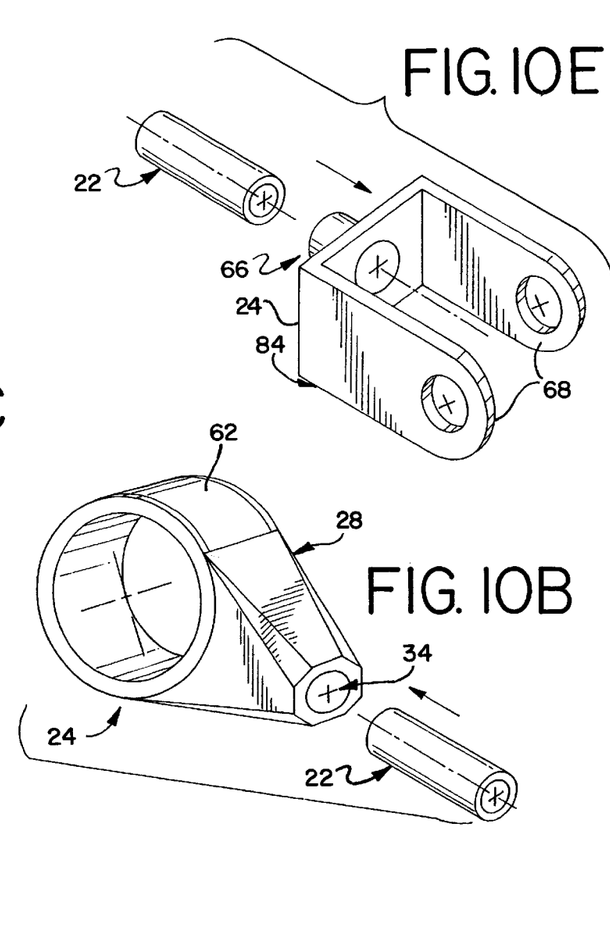
FIG. 10B is a perspective view of an end fitting with a separate cylinder and transition section.
FIG. 10E is a perspective view of a yoke end piece.
Figure 10C:
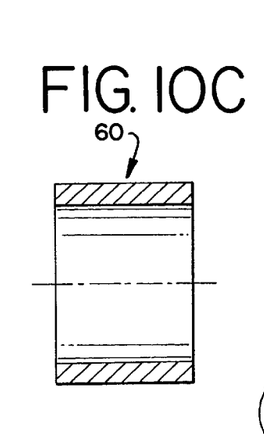
FIG. 10C is a cross-sectional view of an alternative cylinder.
Figure 10D:
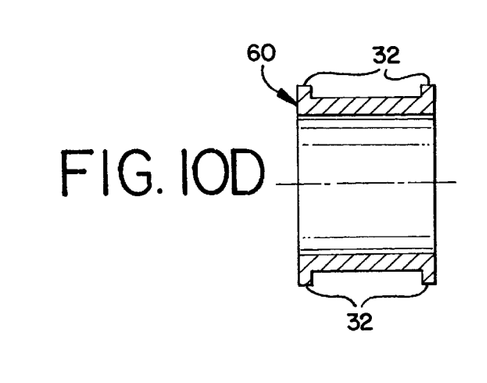
FIG. 10D is a cross-sectional view of another alternative cylinder.

Referring to FIGS. 10–10E, several alternative end fittings 24 are shown. In FIG. 10A, the bushing 26 is a spherical bushing with a spherical bearing joint 58. The bushing 26 is steel, aluminum, high strength fiber-reinforced polymer molding or other materials. The outer body 36 is either one piece, as discussed above, or is divided into two pieces as shown. The two pieces fit together for form the recessed surface 30. Also as shown, the outer body 36 is tapered towards the bushing 26. The tapered portion of the outer body 36 and the exposed outward face of the bushing 26 are covered by conventional dust covers 56. As known in the art, the dust covers 56 protect the spherical bearing joint 58.

In FIG. 10B, another alternative end fitting 24 is shown. The end fitting 24 includes a cylinder section 60 and a transition section 28. However, the transition section 28 and the cylinder section 60 are two different pieces. The cylinder section 60 comprises a large bushing, such as a metal bushing. As shown in the alternative cross-sections, the cylinder section 60 may have flanges 32.

The transition section 28 is preferably a metal piece, but other materials may be used. The transition section 28 is generally the same as the transition section 28 discussed above, but may not have the grooves 42. Additionally, the transition section 28 in this alternative embodiment may have prongs 62 that extend from the transition section 28. The prongs 62 are shaped to fit around a portion of the cylinder section 60 to hold the transition section 28 adjacent to the cylinder section 60. Alternatively, and preferably, the transition section 28 is glued with adhesive to the cylinder section 60. Both the prongs 62 and adhesive may be used to connect the cylinder section 60 and the transition section 28. The transition section 28 joins the cylinder section 60 and the connecting rod 22 as discussed above.

For the alternative embodiment shown in FIG. 10B, a rubber insert with a bushing is press fitted into the cylinder section 60. The fibers 44 are wound around the cylinder section 60 so that the rubber insert may be removed. However, the fibers 44 hold the end fittings 24 against the connecting rod 22, as discussed above.

In FIG. 10E, another alternative end fitting 24 is shown. The end fitting 24 comprises a yoke 64. The yoke 64 includes a sleeve 66. The sleeve 66 press fits, or slides, into or over the connecting rod 22. Preferably, the sleeve 66 is round, or otherwise has a cross-section conforming to the cross-sectional shape of the connecting rod 22. An additional transition section 28 may be added over the sleeve 66 or connecting rod 22. The fibers 44 are wound around the yoke 64 between the arms 68. If a transition section 28 is used, the transition section 28 provides a smoother transition from the yoke 64 to the connecting rod 22 as discussed above.

Any of the end fittings 24 described above may be used on the composite link 20. All the end fittings 24 on a composite link 20 may be of the same type, or different types.

Figures 11, 12:
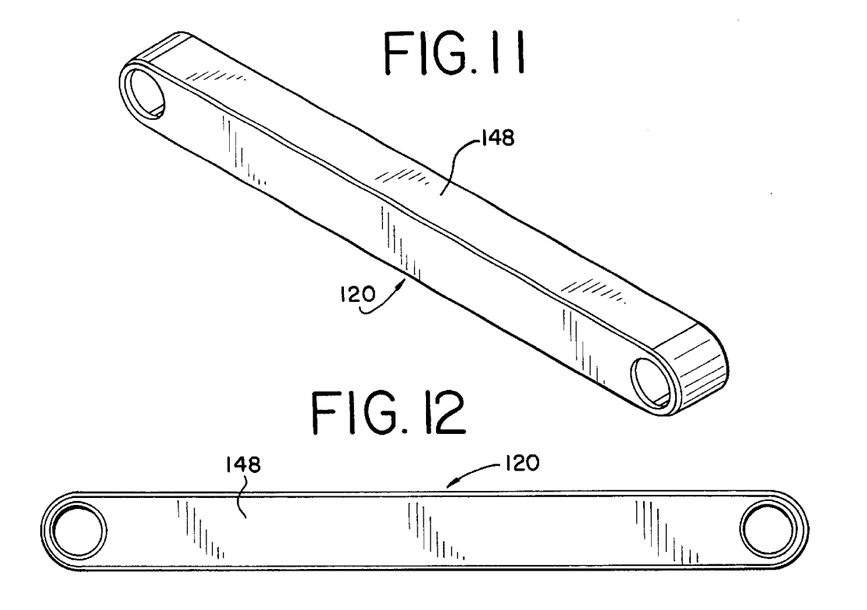
FIG. 11 is a perspective view of another composite link embodying features of the invention.
FIG. 12 is a side elevational view of the composite link of FIG. 11.

Referring now to FIGS. 11 and 12, another composite link embodying features of the invention is seen at 120. The link 120 finds particularly advantageous application as a torque rod link in heavy vehicles such as trucks.

Figures 13, 14:
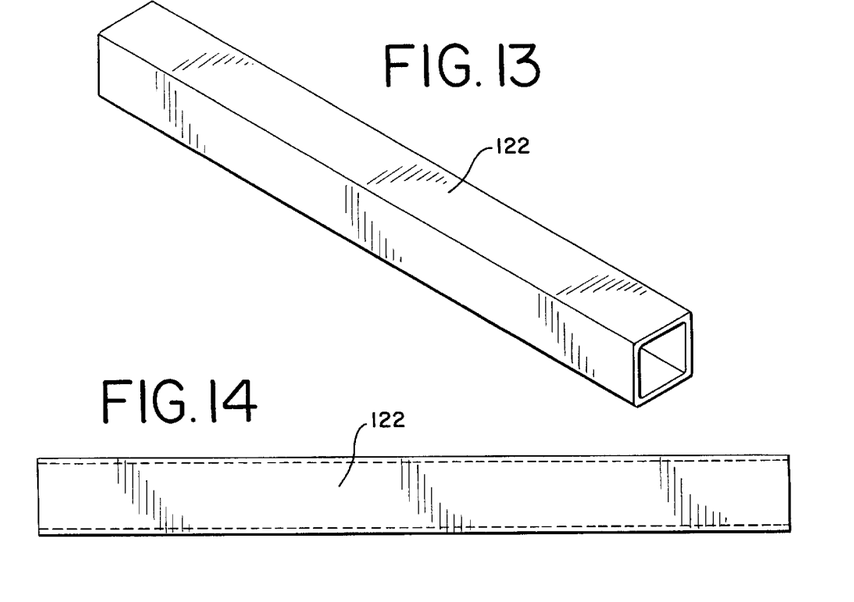
FIG. 13 is a perspective view of the core tube for the link of FIGS. 11 and 12.
FIG. 14 is a side elevational view of the core tube of FIG. 13.
Figures 15, 16, 17:
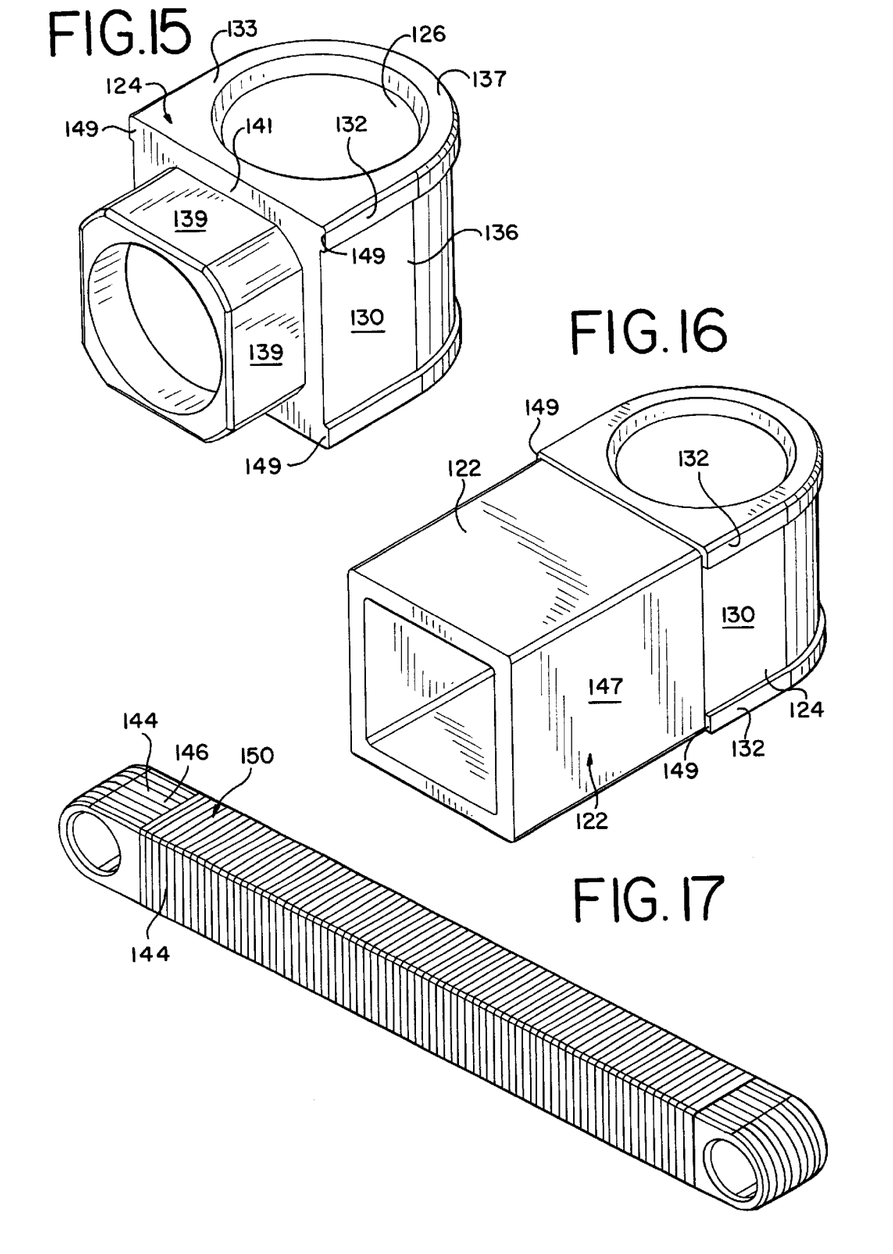
FIG. 15 is a perspective view of an end fitting for the composite link of FIGS. 11 and 12.
FIG. 16 is a perspective view of the mating relationship between the core tube of FIGS. 13 and 14 and the end fitting of FIG. 15.
FIG. 17 is an enlarged perspective view of the composite link of FIGS. 11 and 12 during the fiber strand winding operation.

The composite link 120 seen in FIGS. 11 and 12 is fabricated, according to the invention, from a core tube 122 seen in FIGS. 13 and 15, a pair of end fittings 124 seen in FIGS. 15 and 16 (only one shown), primary and secondary layers of glass fiber 144 windings seen in FIG. 17, and a shield layer 148. The shield layer 148 is seen in FIGS. 11 and 12.

Referring to FIGS. 13 and 15, the core tube 122 is a square cross-section, hollow tube, preferably formed by pultrusion from a fiber reinforced composite material. In the present illustration its cross-sectional (outside) dimensions are 2.50×2.50 inches, and it is 22.88 inches long. The tube includes opposed side walls 127 and opposed side walls 128. Wall thickness is 0.250 inches in the illustrated embodiment. Each end of the tube is a square opening 129.

Turning now to FIG. 16, each end fitting 124 is cast from aluminum. Each end fitting includes a fitting body 136 having a mounting projection 134.

The fitting body 136 includes a base section 123 in the form of a generally rectangular block and a semi-cylindrical cap section 125. A cylindrical bore 126 extends transversely through the body 136, centered at the juncture of the base section 123 and cap section 125. The bore 126 is adapted to receive a cylindrical rubber insert, and a cylindrical metal bushing in the insert (not shown), through which the link 20 is connected to a suspension system component, for example.

The body 136 has opposed side faces 133 through which the bore 126 opens. The base section 123 had a bottom face 141 thereon from which the mounting projection 134 extends. The side faces 133 terminate at the bottom face 141.

Opposed flanges 132 extend along each side face 133 of the body 136, over the cap section 125, between opposite sides of the bottom face 141. The flanges 132 define a recessed surface 130 between them which extends over the cap section 125 of the fitting 124 and also terminates at the bottom face 141 at its opposite ends. Each flange 132 extends 0.150 inches above the surface 130 and is flush with a corresponding side face 133.

Turning now to FIG. 16, a fitting 124 is seated in each end of the tube 122 by inserting a corresponding mounting projection 134 into the tube. The projection 134 on each fitting 124 has a square cross-section, with chamfered corners at 135. Its external dimensions are such that the faces 139 of the projection slide snugly into an end 129 of the tube 122 until the bottom face 141 of the fitting body 136 engages the end of the tube.

With the fitting 124 seated in the tube 122, as seen in FIG. 16, the outer surfaces of the opposed side walls 127 of the tube are flush with the recessed surface 130. Thus, the free ends 149 of the flanges 132 protrude 0.150 inches outwardly of the sides 128 of the tube side walls 127. However, the outer surfaces of the opposed side walls 128 of the tube 122 are recessed from the corresponding side faces 133 of the body 136. The amount of the recess is also about 0.150 inches.

The preferred construction which has been described includes both a square cross-section core tube 122 and a square cross-section fitting projection 134. It should be understood, however, that each may be rectangular without being square, as long as they are complementary in shape.

Referring now to FIG. 17, in addition to FIG. 16, a resin wetted strand 144 of fibers is repeatedly wound lengthwise over the surfaces 130 of both fittings 124 until it covers those surfaces and forms the primary layer 146 of fibers. The primary layer 146 is wound to a thickness of about 0.100 inches above each surface 130. The same strand 144 is then wound transversely around the tube 122, over the primary layer 146 to form a secondary layer 150. In winding the secondary layer 150, the primary layer 144 is drawn tightly in against the corresponding flat sides of the tube 122.

The pattern of winding of the strand 144 in the primary layer 146 and the secondary layer 150 is the same as that previously described in relation to FIGS. 7 and 8. The primary layer 146 is about two-thirds as thick as the height of the flanges 132. The secondary layer 150 thickness is about 0.100 inches such that its outer surface is recessed inwardly from the faces 133 on the fitting body 124.

The fiber strand layers 146 and 150 are then covered with a shield layer 148 in a manner previously discussed. The shield layer 148 may be formed with paint or molded silicone rubber, for example. The shield layer is applied to a thickness which brings it flush with the top of each flange 132 and with the fitting body side faces 133.

While preferred embodiments of the invention have been described, it should be understood that the invention is not limited to these embodiments, and modifications may be made without departing from the invention. For example, a composite link may be made without a shield layer; the glass layers may be wound in an overlapping pattern rather than being wound concentrically; the second layer could be helical or crosswound; more than two layers could be included; or the strand is preferably continuous throughout the windings but could include several different strands. Therefore, the scope of the invention is defined by the appended claims, and all devices that come within the meaning of claims, either literally or by equivalence, are intended to be embraced therein.

What is claimed is:

1. A composite link, comprising:
   a) a fiber reinforced composite core tube having a rectangular cross-section;
   b) said core tube having open opposite open ends with rectangular inside cross-sections;
   c) an end fitting at each end of said core tube;
   d) each of said end fittings including a fitting body having a mounting projection;
   e) each of said mounting projections having an external cross-section corresponding substantially to said internal cross-section of an open end of said tube and being seated in an open end;
   f) said fitting body including a base section in the form of a generally rectangular block, and a segmentally cylindrical cap section;
   g) said fitting body further including opposed parallel side faces and a flange flush with each side face and extending over said cap section, whereby a recessed surface is formed between said flanges;
   h) a strand of resin impregnated fiber wound longitudinally of the axis of said rod, around and between said end fittings, to form a primary layer of fibers which covers said recessed surface to a height less than the height of said flanges;
   i) a strand of resin impregnated fiber wound transversely around said rod and said primary layer of fibers to form a secondary layer of fibers; and
   j) a shield layer formed over said primary layer between said flanges and said secondary end primary layers around said core tube.

2. The composite link of claim 1 further characterized in that:
   a) said primary and secondary layers are formed with a continuous strand of resin impregnated fiber.

3. The composite link of claim 1 further characterized in that:
   a) said end fittings are formed of aluminum.

4. The composite link of claim 1 further characterized in that:
   a) said rectangular cross-section tube has a first pair of opposed sides and a second pair of opposed sides;
   b) said first pair of opposed sides having outer surfaces substantially flush with corresponding ends of said recessed surface when said mounting projections are seated in said tube.

5. The composite link of claim 4 further characterized in that:
   a) each of said flanges has opposite free ends, each of said free ends extending outwardly from said recessed surface.

6. The composite link of claim 5 further characterized in that:
   a) said second pair of opposed sides have outer surfaces which are recessed from said parallel side surfaces of a corresponding fitting body when said mounting projections are seated.

7. The composite link of claim 6 further characterized in that:
   a) said shield layer has an outer surface which is substantially flush with the top of said flanges.

8. The composite link of claim 7 further characterized in that:
   a) said shield layer outer surface is also substantially flush with said fitting body side faces.

* * * * *